United States Patent
Desjarlais

[11] 3,857,896
[45] Dec. 31, 1974

[54] SUBSTITUTED DIRESORCYL SULFIDE AND SULFOXIDE COMPOUNDS

[76] Inventor: Robert C. Desjarlais, 8 Karen Dr., South Hadley Falls, Mass. 01035

[22] Filed: Dec. 15, 1972

[21] Appl. No.: 315,717

Related U.S. Application Data

[60] Continuation of Ser. No. 156,079, June 23, 1971, abandoned, which is a division of Ser. No. 667,365, Sept. 13, 1967, Pat. No. 3,619,191.

[52] U.S. Cl............. 260/609 F, 260/607 A, 96/91, 260/206
[51] Int. Cl................... C07c 149/36, C07c 147/14
[58] Field of Search .................... 260/609 F, 607 A

[56] References Cited
UNITED STATES PATENTS

| | | | |
|---|---|---|---|
| 2,661,376 | 12/1953 | Comer et al. | 260/607 |
| 2,717,832 | 9/1955 | Sulich | 260/609 F |
| 3,184,310 | 5/1965 | Fritz et al. | 260/239 |

FOREIGN PATENTS OR APPLICATIONS

| | | | |
|---|---|---|---|
| 1,410,795 | 10/1964 | France | 260/609 F |
| 809,338 | 2/1959 | Great Britain | 260/609 F |

OTHER PUBLICATIONS

Dinsberg – "Photosensitive Diazo Compounds," p. 102–104.
Chem. Abstracts, Vol. 32, 4156.8.

Primary Examiner—Lewis Gotts
Assistant Examiner—D. R. Phillips
Attorney, Agent, or Firm—John W. Kane, Jr.; William J. Foley

[57] ABSTRACT

Substituted diresorcyl sulfide and sulfoxide compounds having the general formula:

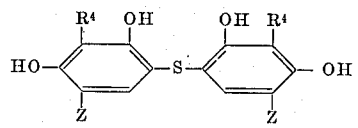

or

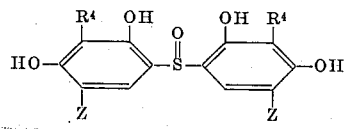

wherein $R^4$ is an alkyl group containing from 1 to 6 carbon atoms, an unsubstituted aryl group, a halo-substituted aryl group, an unsubstituted aralkyl group, an alkyl-substituted aralkyl group, a halo-substituted aralkyl group, an unsubstituted alkaryl group, a halo-substituted alkaryl group, an alkoxy group containing from 1 to 6 carbon atoms, an unsubstituted aryloxy group, a halo-substituted aryloxy group, an unsubstituted aralkoxy group, a halo-substituted aralkoxy group or a halogen atom; and Z is a halogen atom; and light-sensitive diazo compositions and diazotype materials comprising such substituted diresorcyl sulfide and sulfoxide compounds as azo coupling components.

2 Claims, No Drawings

SUBSTITUTED DIRESORCYL SULFIDE AND SULFOXIDE COMPOUNDS

CROSS-REFERENCE TO RELATED APPLICATION

This application is a continuation of application Ser. No. 156,079, filed June 23, 1971 and now abandoned, said application being a divisional application of application Ser. No. 667,365, filed on Sept. 13, 1967 and now issued as U.S. Pat. No. 3,619,191.

BACKGROUND OF THE INVENTION

1. Field of the Invention

This invention relates to a novel class of substituted diresorcyl sulfide and sulfoxide compounds which have been found to be useful as azo coupling components in light-sensitive diazo compositions and diazotype materials.

2. DESCRIPTION OF THE PRIOR ART

U.S. Pat. No. 2,661,376 issued to Comer et al on Dec. 1, 1953, relates to a process from the preparation of 2,2',4,4'-tetrahydroxydiphenyl sulfoxide (unsubstituted diresorcyl sulfoxide) and discloses the use of this compound as a shader for blue dyes in the production of black prints in a diazo printing process; and U.S. Pat. No. 2,717,832, issued to Sulich on Sept. 13, 1955, relates to the use of unsubstituted diresorcyl sulfide or unsubstituted diresorcyl sulfoxide as a substitute for resorcinol as a coupling component in a diazo composition which is intended to provide a storage stable black line diazotype material.

SUMMARY OF THE INVENTION

Substituted diresorcyl sulfide and substituted diresorcyl sulfoxide compounds of the general formula:

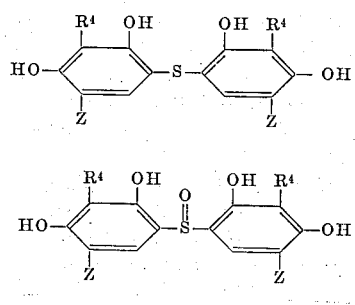

wherein $R^4$ is an alkyl group containing from 1 to 6 carbon atoms, an unsubstituted aryl group, a halo-substituted aryl group, an unsubstituted aralkyl group, an alkyl-substituted aralkyl group a halo-substituted aralkyl group, an unsubstituted alkaryl group, a halo-substituted alkaryl group, an alkoxy group containing from 1 to 6 carbon atoms, an unsubstituted aryloxy group, a halo-substituted aryloxy group, an unsubstituted aralkoxy group, a halo-substituted aralkoxy group or a halogen atom, and Z is a halogen atom, have been found to be useful as orange or sepia azo coupling components in light-sensitive diazo compositions used to prepare light-sensitive diazotype materials. When used as an orange or sepia azo coupling component in diazo compositions and diazotype materials such as those disclosed and claimed in my copending application U.S. Ser. No. 667,365, which has now issued as U.S. Pat. No. 3,619,191 the resulting diazotype materials exhibit excellent light-fastness and good resistance to color changes due to gas fading. When used in combination with blue coupling components having coupling rates which are compatible with the coupling rates of the novel compositions of this invention light-sensitive diazo compositions containing such azo coupler combinations and a diazonium compound such as those disclosed as being useful in the diazo compositions and diazotype materials disclosed and claimed in the aforementioned copending application yield diazotype materials which exhibit a neutral black image over a wide range of image densities, and the image which is obtained shows little or no tendency to color-shift with a change in the pH of the diazotype print.

DESCRIPTION OF THE PREFERRED EMBODIMENTS

The substituted diresorcyl sulfides described above are prepared by reacting sulfur dichloride in the presence of an inert solvent with a resorcinol substituted in the 2-position with an alkyl group, such as methyl group, an ethyl group, a propyl group, a butyl group, an amyl group, a 2-ethyl-butyl group, and the like; an aryl group or halo-substituted aryl group, such as a phenyl group, a p-chlorophenyl group, an m-chlorophenyl group, and the like; an aralkyl group, alkyl-substituted aralkyl group, or halo-substituted aralkyl group such as a benzyl group, a p-methylbenzyl group, a p-chlorobenzyl group, an o-chlorobenzyl group, and the like; and alkaryl group or halo-substituted alkaryl group, such as a xylyl group, a chloroxylyl group, a tolyl group, a chlorotolyl group, and the like; an alkoxy group, such as a methoxy group, a propoxy group, a butoxy group, an amyloxy group, and the like; an aryloxy group or halo-substituted aryloxy group, such as a phenoxy group, a p-chlorophenoxy group, and the like; an aralkoxy group or halo-substituted aralkoxy group, such as a benzyloxy group, a p-chlorobenzyloxy group, and the like; or a halo group, such as a chloro group, an iodo group, a bromo group, and the like; and in the 4-position with a halo group, such as a chloro group, an iodo group, a bromo group, and the like.

Inert solvents such as diethyl ether, dipropyl ether, ethyl acetate, and the like, can be employed, and the reaction temperature can vary, depending on the type of inert solvent which is employed. Temperatures of from about 5°C to about 35°C are preferred, with temperatures of from 5° to about 15°C being particularly preferred with the lower-boiling inert solvents. It is also preferred to conduct the reaction under an atmosphere of a dry, inert gas, such as nitrogen, helium, and the like, said gas being used to facilitate the removal of the hydrogen chloride which is evolved.

The resulting substituted diresorcyl sulfide compounds are easily recovered as crystalline solids having relatively high melting points (in excess of 150°C), and are readily purified by recrystallization from alcohols or ketones, such as acetone and methylethyl ketone. The sulfoxide derivatives of these substituted diresorcyl sulfides are prepared by treating the sulfide with an oxidizing agent, such as hydrogen peroxide, chromic oxide, potassium permanganate, and the like.

5,5'of the compounds of this invention are compounds such as 2,2',4,4'-tetrahydroxy-3,3'-dimethyl-5,5'-dichlorodiphenyl sulfide.

The following Example is provided to illustrate more specifically the method used to prepare the substituted diresorcyl sulfides of the present invention.

PREPARATION OF 2,2',4,4'-TETRAHYDROXY-3,3'-DIMETHYL-5,5'-DICHLORODIPHENYL SULFIDE 11.5 Grams of 2-methyl-4-chlororesorcinol were dissolved in 75 cc. of ethyl acetate and 3.75 grams of sulfur dichloride were added, with stirring, to the 2-methyl-4-chlororesorcinol-ethyl acetate solution over a 30 minute period. During the addition of the sulfur dichloride, the temperature of the reaction mixture was maintained at 15°C; and, upon completion of the addition of the sulfur dichloride, the reaction mixture was stirred for an additional hour. The ethyl acetate was then evaporated from the reaction mixture, and the residue was washed with 100 cc. of toluene. A white solid was collected by filtration and dried to yield 7.2 grams of a product which had a melting point of 198° to 200°C. The 2,2',4,4'-tetrahydroxy-3,3'-dimethyl-5,5'-dichlorophenyl sulfide product analyzed as follows: Carbon: 48.77 (Theoretical:48.4); Hydrogen 3.55 (Theoretical:3.46). Infrared analysis was as follows:

Medium - OH absorption band at 2.88 microns
Weak - OH absorption band at 2.90 microns
Strong phenyl absorption band at 6.28 microns
Strong sulfur-phenyl absorption band at 9.23 microns
Strong chlorine absorption band at 13.5 microns The substituted diresorcyl sulfide couplers and their sulfoxide derivatives described above, have been found to be fast yellow coupling components for the diazonium derivatives of the dialkoxy-substituted paraphenylene diamines which are used as the diazo components in the diazo compositions and diazotype materials disclosed and claimed in my copending application, U.S. Ser. No. 667,365; and they produce diazo prints which exhibit improved resistance to fade under the influence of ultraviolet radiation and visible light. The use of these couplers with the appropriate blue couplers produces neutral black-line diazo prints having a wide range of densities. The advantages of such compounds over those presently available will be apparent to those skilled in the art, since it has heretofore been difficult to obtain a neutral black-line diazo print over a wide density range, particularly with only two coupling components.

What is claimed is:

1. A compound having a general formula selected from the class consisting of

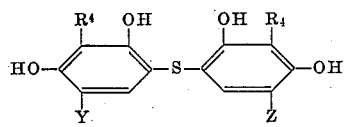

and

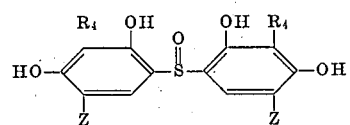

wherein $R^4$ is an alkyl group containing from 1 to about 6 carbon atoms and Z is a halogen atom.

2. A compound as claimed in claim 1 having the structural formula:

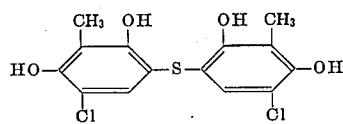

* * * * *